United States Patent [19]

Heckert et al.

[11] 3,764,617
[45] Oct. 9, 1973

[54] PROCESS FOR PREPARING VICINAL GLYCOLS FROM OLEFINS

[75] Inventors: David C. Heckert, Oxford; Donald V. Julian, Colerain Township, Hamilton County, both of Ohio

[73] Assignee: The Procter & Gamble Company, Cincinnati, Ohio

[22] Filed: June 29, 1970

[21] Appl. No.: 51,022

[52] U.S. Cl. .............. 260/410.7, 260/405, 260/408, 260/410.9 R, 260/413, 260/468 R, 260/473 A, 260/476 R, 260/484 A, 260/484 R, 260/491, 260/485 H, 260/52 D, 260/533, 260/611 R, 260/615 R, 260/634, 260/635 H, 260/617 R, 260/631 R
[51] Int. Cl. ... C07c 29/02, C07c 31/34, C07c 67/00
[58] Field of Search ................. 260/635 H, 410.9 R, 260/410.7, 413, 636

[56] References Cited
UNITED STATES PATENTS

| | | | |
|---|---|---|---|
| 3,427,347 | 2/1969 | Lapporte | 260/491 |
| 3,562,315 | 2/1971 | Cookson et al. | 250/493 |

FOREIGN PATENTS OR APPLICATIONS 529,476  11/1940  Great Britain

Primary Examiner—Lewis Gotts
Assistant Examiner—Diana G. Rivers
Attorney—Jack D. Schaeffer and Richard C. Witte

[57] ABSTRACT

Process for preparing haloesters, halohydrins and vicinal glycols by halogenating olefins in the presence of water and an amide.

7 Claims, No Drawings

PROCESS FOR PREPARING VICINAL GLYCOLS FROM OLEFINS

BACKGROUND OF THE INVENTION

This invention relates to an improved process for the preparation of haloesters, halohydrins and vicinal glycols by the reaction of halogens with olefins.

It is well recognized that the halogenation of olefins generally proceeds almost exclusively by addition across the olefinic double bond and results in the formation of vicinal dihalides. To effect the vicinal halogenation of olefins all that is required is that the halogen be added in the requisite amount to the olefin. In the case of chlorine, this is conveniently accomplished by bubbling the halogen through the olefin or a solution thereof. Bromine and iodine may be conveniently added portionwise to the olefin and allowed to react. Often, a competing reaction is replacement of hydrogen in the olefin by the halogen. To minimize this, the reaction can be done in a solvent which serves as a diluent and thereby moderates the reaction so that simple addition of the halogen across the double bond is the predominant reaction which occurs. Alternatively, the halogen can be diluted. When chlorine is being employed, it is conveniently diluted with air or an inert gas. Bromine and iodine can be dissolved in a solvent and added portionwise, in dilute solution, to the olefin. Commonly, both the olefin and the halogen are so diluted prior to admixing. The halogenation reaction of the present invention differs from the prior art halogenation of olefins in that it occurs only in the presence of certain amide/water mixtures hereinafter described and results not in the formation of the expected vicinal dihalides, but rather, in reaction products containing a single halogen atom and a group derived from the amide or in vicinal glycols or halohydrins.

Under certain of the conditions hereinafter defined, halogenation of olefins by the process of this invention results in the formation of vicinal haloesters. Such haloesters find use as plasticizers and intermediates in the preparation of commercially important epoxide materials. By suitable variations in the details of the present halogenation reaction, halohydrins are produced. These halohydrins are useful as plasticizers and as starting materials in the base-catalyzed preparation of commercially important epoxides and glycols. In addition, the halogenation of olefins by the present process under the appropriate conditions results in the formation of vicinal glycols. Vicinal glycols, in turn, are important additives for polyesters and also serve as starting materials in the preparation of carboxylic acids by the process described in the co-pending application of E. P. Pultinas, Jr., Ser. No. 51,023, filed June 29, 1970, now abandoned.

Accordingly, it is a primary object of the present invention to provide an improved process for the preparation of haloesters, halohydrins and vicinal glycols. It is a further object of this invention to provide a quick, effective means for the conversion of olefins to haloesters, halohydrins and vicinal glycols. These and other objects and obtained by the present invention as will become apparent from the following disclosure.

SUMMARY OF THE INVENTION

The process of the present invention comprises reacting an olefin with a halogen in the presence of a mixture of certain amides and water, in specified proportions, all as hereinafter disclosed. The specific reaction product of the present process (halohydrin, haloester or glycol) depends primarily on the proportion of water relative to olefin present in the reaction mixture. Reaction A, depicted below, illustrates the preparation of haloesters by the halogenation reaction of this invention performed in the presence of amide and one equivalent of water. Reaction B, depicted below, illustrates the preparation of halogydrins by the halogenation in the presence of amide and two equivalents of water. Reaction C illustrates the preparation of glycols in the presence of amide and three or more equivalents of water.

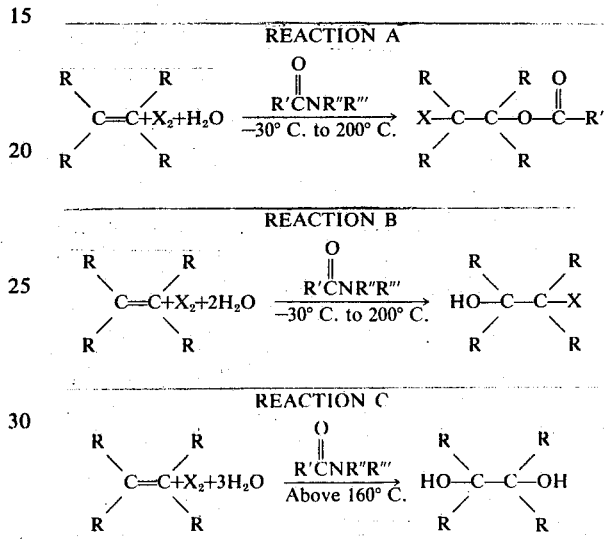

wherein $X_2$ represents halogens (preferably bromine and chlorine) other than fluorine and wherein each R represents hydrogen, alkyl containing from one to about 25 carbon atoms, aryl (e.g., phenyl, naphthyl, anthracenyl, phenylethyl, benzyl), carboxyalkyl (i.e., $-(CH_2)_n COOH$ where $n$ is 1–25), alkoxy, alkylglycerylester, alkylester, nitroalkyl, haloalkyl, polyalkoxyalkyl, and the like. Chlorine is especially preferred as the halogen for economic reasons.

Olefins which can be used in the practice of the present invention are limited only in that they must be miscible with the amide/water mixture. Olefins having from two to about 102 carbon atoms, and preferably five to 20 carbon atoms, are all suitable for use here. Such olefins can be derived from any of a number of well-known sources. For example, olefins distilled from petroleum feedstocks are suitably employed in the practice of the present invention. Similarly, alkenes formed from refinery gases resulting from the industrial cracking of petroleum can be used as well as olefins formed by the partial hydrogenation of acetylenic hydrocarbons.

Cyclic olefins having from about four to about 20 carbon atoms and preferably from about five to about 12 carbon atoms are also suitable for use herein.

Non-limiting examples of olefins which can be halogenated in accordance with this invention include cyclopentene, cyclohexene, cyclooctene, cyclododecene, cyclo-eicosene, 1-pentene, 2-pentene, 1-hexene, 2-hexene, 3-hexene, 1-heptene, 2-heptene, 3-heptene, 1octene, 2-octene, 1-nonene, 2-nonene, 3-nonene, 4- nonene, 1-decene, 1-undecene, 1-dodecene, 2-dodecene, 3-dodecene, 4-dodecene, 5-dodecene, 1-tridecene, 1-tetradecene, 1-pentadecene, 1-hexcosene, 2-hexcosene, 3-docosene, 1-octadecene and 1-heneicosene. The novel reaction of the present invention proceeds well with both terminal and internal olefins.

Exemplary branched-chain olefins suitable for use in the novel reaction of this invention include 2-methyl-1-pentene, 2-naphthyl-3-hexene and 2-phenyl-4-dodecene, all of which form the reaction products corresponding to Reaction A, B or C, as outlined in the general reaction scheme, depending on whether one, two or three equivalents of water, based on olefin, are present with the amide.

Various unsaturated fatty acids and their esters, especially those obtainable from natural fats and waxes, can be halogenated in the present process. For example, oleic acid, ricinoleic acid, palmitoleic acid, petroselinic acid, vaccenic acid, erucic acid and the like, can be reacted with halogen in the presence of amide and water according to the present process and, depending upon the mole equivalents of water present as hereinbefore described, undergo either a type A, B or C reaction and result in the corresponding products as detailed in the working examples hereinafter provided.

Commercially available mixtures of fatty acids and their alkyl esters obtainable from a wide variety of natural animal and plant fats and waxes can also be halogenated in the practice of the present invention. Such mixtures contain both unsaturated and saturated fatty acids. The saturated fatty acids are not involved in the reaction by virtue of their lack of olefinic linkages; they are present in the reaction mixtures as mere diluents and can be removed at a convenient time so that the desired reaction products can be isolated. Any of the common sources of fatty acid mixtures can be used to provide suitable fatty acids. Palm oil, peanut oil, corn oil, linseed oil, soybean oil, lard, tallow, Neat's-foot oil and the like, are all suitable sources for glycerides which, upon hydrolysis, yield acid mixtures suitable for halogenation.

Alternatively, those glycerides containing unsaturated fatty acids which are present in the various natural fats and oils can be directly reacted with halogen in the presence of the amide/water mixture without prior hydrolysis to yield the haloester, halohydrin or glycol derivatives of the respective glycerides. For example, in this fashion the corresponding haloesters, halohydrins and glycols of palm oil, peanut oil, corn oil, linseed oil, tallow, lard, soybean oil, babassu oil, Neat's-foot oil, whale oil and the like are prepared using the halogenation process herein disclosed.

Especially preferred olefinic compounds used in the practice of this invention are 1-octene, 1-decene, 1-dodecene, 1-tetradecene, 1-hexadecene, 1-octadecene, oleic acid, methyl oleate, ricinoleic acid, and methyl ricinoleate. The unsaturated glyceride esters hereinbefore noted are also preferred olefinic compounds used in the practice of this invention. Of these glyceride esters, those present in lard, tallow and soybean oil are especially preferred.

The amides suitable for use in the present process are those which do not contain a nitrogen-hydrogen (N—H) bond; that is to say, dialkyl, diaryl, and alkyl-aryl amides. Likewise, both water and the olefin undergoing reaction must be suitably co-miscible with such amides. Amides having the general formula R'C(O)NR''R''', wherein R' is a member selected from the group consisting of hydrogen, normal, branched-chain and cyclic alkyl groups containing from about one to about 10 carbon atoms, preferably from about one to about seven carbon atoms, and phenyl and wherein R'' and R''' are each members selected from the group consisting of normal, branched-chain, and cyclic alkyl groups containing from about one to about 10 carbon atoms, preferably from about one to about five carbon atoms and phenyl, are suitable for use. If it is desired to perform the reaction of the present invention at room temperatures, amides having low molecular weights can be used since they are liquids at such temperatures. Should it be desired to do the reaction at higher temperatures, either the lower alkyl amides or the alkyl amides having the longer chains in the above-recited ranges can be utilized in that these latter compounds will be liquified at such temperatures.

Non-limiting examples of amides suitable for use as the solvent in the practice of the novel process of this invention include: dimethylformamide, diethylformamide, dipropylformamide, dibutylformamide, dioctylformamide, didecylformamide, dimethylacetamide, dimethylpropionamide, dimethylbutyramide, dimethylpentanamide, dimethylcyclohexanamide, dimethyldecanamide, diethylacetamide, dipropylpropanamide, dibutylbutyramide, dicyclopentylbutyramide, dioctyldecanamide, didecyldecanamide, diphenylacetamide, dimethylbenzamide, methylphenylacetamide, diphenylbenzamide and dimethylcyclohexanamide. Any of these amides can be prepared by the condensation of the corresponding acid or acid halide with the corresponding dialkyl or diaryl amine in the manner well-known to those skilled in the art. Certain tetraalkyl diamides can be suitably employed in the practice of the novel process of this invention. For example, N,N,N',N'- tetraalkyl diamides of oxalic acid, malonic acid, succinic acid, etc., wherein the alkyl groups are those hereinbefore noted as suitable for use in the mono-amide materials utilized in the novel process of the present invention, may be suitably employed. Preferred amides useful in the practice of the present invention are the N,N-dimethylakanoyl amides. Especially preferred amides suitable for use in the practice of the present invention are: dimethylformamide, dimethylacetamide, dimethylpropionamide, dimethylbutyramide, dimethylpentanamide, dimethyloctanamide, dimethylnonanamide, dimethyldecanamide and dimethylbenzamide.

According to the general reaction scheme, Reaction A involves the halogenation of an olefin in the presence of an amide and one equivalent of water for each equivalent of olefin present in the reaction mixture. To achieve optimum yields of haloester, at least two moles of amide for each mole of olefin should be present since one mole of amide is consumed in the formation of amide hydrohalide by-product. (This is also true in B and C.) However, the process does occur as indicated in Reaction A if less amide is used, albeit in reduced product yields. The reaction product is a haloester whose ester functionality is derived from the alkanoyl group of the amide. For example, halogenation of an olefin in the presence of one equivalent of water and two equivalents of dimethylformamide according to the process of this invention results in the formation of the haloformate ester of the parent olefin. Likewise, use of dimethylacetamide results in the formation of the haloacetate ester of the parent olefin. Likewise, use of dimethylpropionamide results in the formation of the halopropionate ester of the parent olefin. Thus haloesters having nearly any desired ester functionality can be prepared by the process of this invention as represented by Reaction A by using an amide which has the desired alkanoyl group. Of course, the halogen functionality can similarly be varied by the choice of halogen used as hereinbefore described.

Reaction A is most preferably performed by mixing the selected olefin and about a five-fold to 20-fold molar excess of amide together with one equivalent of water for each equivalent of olefin and adding thereto, portionwise, one equivalent of halogen. The reaction proceeds readily without initiation and is exothermic. The reaction products are not temperature dependent and good yields of haloesters are formed at temperatures from −30° to 200°C. and preferably from about 0°C. to about 100°C.

As hereinbefore disclosed, use of two moles of water for each equivalent of olefin results in a reaction represented herein as Reaction B. Again, for best results, two moles of amide per mole of olefin should be present. If less amide is used, product yields are reduced. The product of this reaction is not a haloester, but rather, a halohydrin. In Reaction B, the olefin is conveniently admixed with a five-fold to 20-fold molar excess of amide and two equivalents of water per equivalent of olefin. One equivalent of halogen per equivalent of olefin is added to the reaction mixture, portionwise, and a halohydrin is formed.

The reaction products formed in Reaction B do not depend on temperature and pressure and halohydrins can be prepared by this process at temperatures ranging from about −30°C. to about 200°C. and preferably from 0° to 100°C. In some instances it may be convenient to use an excess of water to insure completion of the reaction. If an excess of water is used with the amide, the reaction temperature must be maintained at or below 160°C. to avoid the reaction of the halohydrins to form vicinal glycols (Reaction C). This glycol formation does not occur if the amount of water in the amide is limited to two equivalents, based on the amount of olefin used in the reaction.

Reaction C can be used if it is desired to prepare vicinal glycols directly from olefins. This is conveniently done by halogenating an olefin of the type herein described in the presence of at least three moles of water per mole of olefin in an excess of an amide, as herein detailed, at temperatures above 160°C., preferably 170° to 250°C. Any of the olefins as hereinbefore disclosed will undergo conversion to their corresponding vicinal glycol when so treated in the presence of at least three moles of water and an amide of the type noted previously. Bromine, chlorine and iodine represent halogens suitable for use in this process, with bromine and chlorine being preferred. Chlorine is especially preferred halogen for use in this glycol synthesis.

Reaction A, Reaction B and Reaction C are not dependent on pressure and may be run at pressures between 1 and 1,000 atmospheres. Reaction C is preferably done at 30–200 psi. so as to prevent water loss at the reaction temperatures.

The rates of Reactions A, B and C can be varied by the rate of halogen addition, but the nature of the reaction products does not depend thereon. Chlorine is the preferred halogen for use in Reactions A, B and C for economic reasons.

The following Examples, which are not intended to be limiting, serve to demonstrate the process of this invention.

REACTION A

EXAMPLE I

Reaction of 1-Decene with Chlorine in Dimethylformamide

A mixture of 6.3 g. (0.045 mole) of 1-decene, 0.8 g. (0.045 mole) of water, and 100 ml. of dry dimethylformamide (DMF) was placed in a 250 ml. flask equipped with a mechanical stirrer. A mixture of chlorine and air was passed into the reaction mixture at the rate of 4 meq., $Cl_2$/min. until a total of 0.045 moles of $Cl_2$ has been added. The reaction mixture was poured into 300 ml. of water and quickly extracted with three-150 ml. portions od diethyl ether. The ether extracts were dried over $MgSO_4$ and the ether was removed by distillation. Chromatography (Carbowax/220°C./He flow 70 ml. /min.) indicated that the product contained 89 percent chloroformyloxydecane (2 isomers), 9 percent 1,2-dichlorodecane, and a trace of the chlorohydrins (2 isomers). Vacuum distillation yielded 8.3 g. (84 percent) of

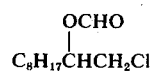

b.p. 78°–81°/0.15 mm. Hg.

An equivalent amount of bromine is sustituted for the chlorine in the above process and decane bromoformate is formed.

An equivalent amount of 2-decene, 1-butene, 1-pentene, 1-hexene, 1-octene, 1-dodecene, 1-tetradecene, 1-hexadecene, 1-octadecene, methyl oleate, ethyl oleate, pentyl oleate, phenyl oleate, 1-hexadecene, 1-eicosene, 2-eicosene, 3-eicosene, 3-hexadecene, 2-dodecene, 2-heptene, 2-methyl-3-heptene, 1-phenyl-2-dodecene, cyclohexene and cyclododecene, respectively, is substituted for the 1-decene in the above process. The reaction product in each case is the corresponding chloroformate, isomeric at the original position of olefinic unsaturation.

EXAMPLE II

Reaction of 1-Decene with Chlorine in Dimethylacetamide

A mixture of 6.3 g. (0.045 mole) of 1-decene, 0.8 g. (0.045 mole) of $H_2O$, and 100 ml. of dry dimethylacetamide (DMAC) was placed in a 250 ml. flask and stirred. A mixture of chlorine and air was passed into the reaction mixture at the rate of 4 meq. of $Cl_2$/min. until a total of 0.045 mole of $Cl_2$ had been added. The reaction mixture was poured into 300 ml. $H_2O$ and extracted with three-150 ml. portions of diethyl ether. The combined ether extracts were dried over $MgSO_4$ and the ether was removed by distillation. The remaining material was analyzed by gas-liquid chromatography and proved to be 90 percent chloroacetoxydecane (2 isomers), 9 percent dichloride and about 1 percent chlorohydrin. Vacuum distillation yielded 9.1 g. (86 percent) of the chloroacetate

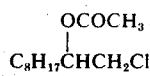

(2 isomers) b.p. 78°–79°/ 0.05 mm. Hg.

An equivalent amount of dimethylpropionamide, diethylacetamide, and dimethylbenzamide, respectively, is substituted for the dimethylacetamide in the above process and the reaction products are mixtures of isomers of the corresponding chloroester, i.e., decane chloropropionate, decane chloroacetate, and decane chlorobenzoate, respectively.

EXAMPLE III

Chlorination of Soybean Oil in Dimethylformamide 11.68 g. soybean oil (SBO) (Approx. 0.013 M) (double bond equivalent weight = 188), 1.08 g. $H_2O$ and 135 ml. dimethylformamide (DMF) were placed in a 250 ml. round-bottom flask fitted with either a mechanical stirrer, reflux condenser and sintered glass gas bubbler. Chlorine gas was metered into the reaction mixture at a rate of 4 milliequivalents/min. and diluted with dry air entering at a rate of about 200–300 cc/min. The gases were thoroughly mixed in a large (2 liter) Erlenmeyer flask fitted with gas inlet tubes at the top and an exit tube at the bottom. The reaction mixture was initially two phase but became homogeneous as the halogenation reaction proceeded. The reaction was begun at room temperature but the temperature slowly rose to about 50°C. as the reaction proceeded. No attempt was made to cool the system. After the desired amount of chlorine was introduced, the reaction was worked up immediately.

Most of the DMF was distilled from the reaction at 40° to 50°C under oil pump vacuum. The distillation was done directly from the reaction flask, which was suitably fitted with a distillation head. The receiver was another flask cooled in a dry ice-acetone bath and fitted with a cold-finger dry ice condenser. After most of the DMF was removed the product was dissolved in dichloromethane and this solution was extracted with water. The layers were separated and the organic phase removed, dried ($MgSO_4$) and the solvent evaporated as described above. By leaving the product at 40° C on a rotary evaporator under oil pump vacuum overnight, the DMF was removed leaving 15.1 g. (91 percent) of the chloroformoxylated soybean oil.

An equivalent amount of bromine is substituted for the chlorine in the above process and the corresponding bromoformate derivative of soybean oil is formed.

An equivalent amount of tallow oil, based on the degree of unsaturation, is substituted for the soybean oil in the above process and the process is done at 120°C. The chloroformate derivative of tallow is formed.

An equivalent amount of dimethylcyclohexanamide is substituted for the dimethylformamide in the above process and the chlorocyclohexanate derivative of soybean oil is formed.

In the above process there is substituted for the soybean oil an equivalent amount, based on the degree of unsaturation, of palm oil, whale oil, babassu oil, tung oil, Neat's-foot oil, coconut oil, olive oil, lard and corn oil, respectively, and the formation of the corresponding chloroformate of the respective oils results.

EXAMPLE IV

Reaction of Oleic Acid with Chlorine in Dimethylformamide

One gram mole of oleic acid, one gram mole of water and a ten-fold excess of dimethylformamide are stirred at 120°C. while a stream of chlorine gas admixed equally with air is bubbled through the reaction mixture at a rate of 24 grams of chlorine per hour for three hours. Work-up as described above yields the chloroformyloxy derivatives of stearic acid isomeric at carbon atoms 9 and 10. The process is run at reaction temperatures of −30°C., 100°C. and 200°C., at 1,100 and 1,000 psi., respectively, and the chloroformyloxy esters are formed in good yields.

EXAMPLE V

Reaction of Oleic Acid with Chlorine in Dimethylalkanyl Amides

According to the procedure of Example I, a mixture of one mole of oleic acid, one mole of chlorine, one mole of water and about a 15-fold volume excess of dimethylformamide (DMF) are reacted at 50°C. The reaction product is a mixture of chloroformyloxy derivatives of stearic acid, isomeric at carbon atoms 9 and 10.

In like manner, dimethylacetamide, dimethylpropionamide, dimethylbutyramide, dimethylpentanamide, dimethyldecanamide, and dimethylbenzamide, respectively, are substituted in equivalent volume for the DMF in the above process and yield, respectively, the chloroacetate, chloropropionate, chlorobutyrate, chloropentanate, chlorodecanate, and chlorobenzoate derivatives of stearic acid, said derivatives being isomeric at carbon atoms 9 and 10.

EXAMPLE VI

Reaction of Oleic Acid with Bromine in Dimethylalkanoyl Amides

According to the procedure of Example I, a mixture of one mole of oleic acid, one mole of bromine, one mole of water and about a 15-fold volume excess of dimethylformamide (DMF) are reacted at 50°C. The reaction product is a mixture of bromoformyloxy derivatives of stearic acid, isomeric at carbon atoms 9 and 10.

The reaction is run at −10°C., 0°C. and 50°C. and the same results are obtained in that the respective bromoalkanoates of stearic acid are formed. The same results are obtained at 1, 10 and 50 atmospheres pressure.

REACTION B

EXAMPLE VII

Chlorination of 1-Decene in Dimethylformamide Containing More Than One Equivalent of Water A mixture of 6.3 g. (0.045 mole) of 1-decene, 8 g. (0.45 mole) of water and 100 ml. dry dimethylformamide was placed in a 250 ml. flask equipped with a mechanical stirrer. A mixture of chlorine and air was passed into the reaction mixture, which was maintained at 50°C., at a rate of 4 meq. $Cl_2$/min. After the theoretical amount of chlorine had been added the mixture was stirred for 1 hour without heating. Extraction with ether yielded a colorless oil which was shown by gas-liquid chromatography to be composed of 85 percent

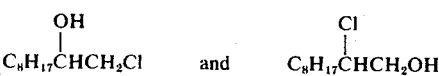

in approximately a 2:1 ratio, 4 percent of the corresponding chloroformates, and 10 percent 1,2-dichlorodecene. Distillation yielded 6.95 g. 80 percent yield) of the chlorohydrin, b.p. 65°–68°/0.06 mm. Hg.

An equivalent amount of an olefin selected from the group consisting of 1-butene, 1-pentene, 1-hexene, 1-octene, 1-dodecene, 1-tetradecene, 1-hexadecene, 1-octadecene, 1-eicosene, 2-eicosene, 3-eicosene, 3-hexadecene, 2-decene, 2-dodecene, 2-heptene, 2-methyl-3-heptene, 1-phenyl-2- dodecene, cyclohexene and cyclododecene is substituted for the 1-decene in the above process and the reaction is carried out at 100°C. and 150°C. in an autoclave. Formation of the corresponding chlorohydrins isomeric at the original position of olefinic unsaturation results.

Two moles of water, 1 mole of 1-decene and 1.5 moles of dimethylformamide are admixed and reacted with 1 mole of chlorine at 200°C. The two isomeric decane chlorohydrins are formed.

EXAMPLE VIII

Bromination of 1-Decene in Dimethylformamide Containing More Than One Equivalent of Water A mixture of 5 ml. (3.7 g., 0.026 mole) of 1-decene, 5 ml. of water, and 70 ml. of dimethylformamide was rapidly stirred and 1.4 ml. (4.2 g., 0.026 mole) of bromine was added dropwise at 30°C. The yellow solution was stirred for one hour then poured into 300 ml. of water. Three-150 ml. diethyl ether extracts of the aqueous mixture were combined and dried over $MgSO_4$. After removing the ether by distillation, the yellow oil was analyzed by gas-liquid chromatography and was shown to contain, by area percent, 20 percent 1,2-dibromodecane, with the remaining 80 percent consisting of the two 1,2-bromohydrin isomers.

An equivalent amount of dimethylpropionamide or diethylacetamide is substituted for the dimethylformamide in the above process and the reaction is run at 0°C.; decane bromohydrin is formed.

EXAMPLE IX

Chlorination of Methyl Oleate in Dimethylformamide Containing More Than One Equivalent of Water Methyl oleate (4.5 g., 0.015 mole) and 5 ml. $H_2O$ were dissolved in 65 ml. of dimethylformamide. The mixture was rapidly stirred and a chlorine-air mixture (as previously described) was bubbled into the solution through a sintered glass gas bubbler at about 30°C. The chlorine addition rate was maintained at 4 meq./min. until 0.015 moles had been added. The mixture was poured into 300 ml. of $H_2O$ and extracted with three-150 ml. portions of diethyl ether. The combined ether extracts were dried over $MgSO_4$, filtered, and the ether was removed by distillation. Gas-liquid and thin layer chromatography indicated two components in approximately an 80/20 mixture. The larger component was found to be a mixture of two 9,10-chloroformyloxy isomers of methyl stearate, and the corresponding chlorohydrins, while the smaller component was the methyl stearate impurity in the starting material. Elemental analysis indicated that the major component was a 2:1 mixture of the chlorohydrin and its formate ester.

An equivalent among of a member selected from the group consisting of ethyl oleate, butyl oleate, pentyl oleate, oleic acid, ricinoleic acid, and methyl ricinoleate is substituted for the methyl oleate of the above process, and results the formation of the corresponding chlorohydrin derivatives, isomeric at the original position of olefinic unsaturation.

EXAMPLE X

Chlorination of trans-5-Decene in Dimethylformamide Containing More Than One Equivalent of Water A total of 5 ml. (3.7 g., 0.026 mole) of trans-5-decene was dissolved in 70 ml. of dimethylformamide and 5 ml. of $H_2O$ was added. The mixture was chlorinated by means of an air-chlorine mixture passed through a sintered glass gas bubbler directly into the stirred solution at 30°C. The chlorine addition rate was maintained at approximately 4 meq./min. until 100 percent of the theoretical chlorine has been added. The mixture was poured into 300 ml. of $H_2O$ and extracted with three-150 ml. portions of diethyl ether. The combined ether extracts were dried over $MgSO_4$ and the ether was removed by distillation. Gas-liquid chromatographic analysis of the clear, oily residue indicated the reaction product to be composed of 10 percent 5,6-dichlorodecane, 44 percent of the 5-chloro-6-formyloxydecane and 46 percent of the 5-chloro-6-hydroxy decane. When the reaction mixture was allowed to stir one hour after the chlorine had been added, the formation of 5-chloro-6-hydroxydecane was 95 percent complete.

The dimethylformamide is replaced by an equivalent amount of dimethylacetamide, dimethylpropionamide, dimethylbutyramide, dimethylpentanamide, dimethylhexanamide, dimethyloctanamide, dimethyldecanamide, dimethylbenzamide, or dibenzylbenzamide and the reaction carried out at 120°C. and 150 psi. in a closed vessel; 5-chloro-6-hydroxydecane is formed.

EXAMPLE XI

Reaction of Oleic Acid with Bromine in Dimethylalkanoyl Amides Containing More Than One Equivalent of Water According to the procedure of Examples VIII, one mole of oleic acid and one mole of bromine are reacted in a mixture of two moles of water and five moles of dimethylformamide, at a temperature of 200°C. in an autoclave. The compounds 9-bromo-10-hydroxystearic acid and 9-hydroxy-10-bromostearic acid are secured.

Iodine is used in place of bromine and the reaction is run at 50°C. and 180°C. and the iodohydrin derivatives of stearic acid, isomeric at carbon atoms 9 and 10, are formed.

Chlorine is used in place of bromine and the reaction is run at 50°C., 150°C. and 200°C. and the chlorohydrins of stearic acid, isomeric at carbon atoms 9 and 10, are formed.

One pound of soybean oil containing about 40–60 percent by weight of unsaturated triglyceride is treated together with 1 gallon of water and one gallon of dimethylformamide at 70°C. by bubbling chlorine gas through the mixture until analysis (infrared) indicates saturation of the olefinic bond is complete. The reaction product proves to be a mixture of the chlorohydrins of soybean oil triglycerides.

Neat's-foot oil, tallow, lard and corn oil are substituted in the above reaction with substantially equivalent results in that the corresponding halohydrins are thereby secured.

The dimethylformamide is replaced by a member selected from the group consisting of dimethylacetamide, dimethylpropionamide, dimethylbutyramide, dimethylpentanamide, dimethyldecanamide and dimethylbenzamide and equivalent results are obtained in that the halohydrin derivatives of the olefins are formed.

REACTION C

EXAMPLE XII

Chlorination of 1-Decene in Dimethylformamide Containing More Than One Equivalent of Water - Above 160°C.

The reaction mixtures of Example VII are prepared and the reactions are carried out at 200°C. in an autoclave. The vicinal glycol derivatives of the corresponding olefins are thereby secured.

EXAMPLE XIII

Bromination of 1-Decene in Dimethylformamide Containing More Than One Equivalent of Water - Above 160°C.

The reaction mixtures of Example VIII are prepared and the reactions done at 180°C. and 100 psi. in an autoclave. The vincinal glycol, 1,2-dihydroxydecane, is obtained.

EXAMPLE XIV

Chlorination of Methyl Oleate in Dimethylformamide Containing More Than One Equivalent of Water - Above 160°C.

The reaction mixtures of Example IX are prepared and the reactions are carried out at 200°C. and 200 psi. in an autoclave. The corresponding vicinal glycols of the respective alkyl and phenyl oleates are obtained.

EXAMPLE XV

Chlorination of trans-5-Decene in Dimethylformamide Containing More Than One Equivalent of water - Above 160°C.

The reaction mixtures of Example X are prepared and the reactions are carried out at 160°C., 200°C. and 250°C. at autoclave pressures of 10 and 100 atmospheres; 5,6-dihydroxydecane is formed.

EXAMPLE XVI

Reaction of Oleic Acid With Bromine in Dimethylakanoyl Amides Containing More Than One Equivalent of Water - Above 160°C.

To each of the reaction mixtures of Example XI is added an additional one equivalent weight of water. The mixtures are heated at 160°C. and the vicinal glycols (corresponding to the original olefins) are secured. The reaction is done at 170°C. and 50 psi. and at 300°C. and 100 psi., in an autoclave, with the same results.

What is claimed is:

1. A process for preparing vincinal glycols from olefins, comprising halogenating said olefins in the presence of an amide of the formula R'C(O)NR"R''', wherein R' is a member selected from the group consisting of hydrogen, normal, branch-chained and cyclic alkyl groups containing from one to about 10 carbon atoms and phenyl and wherein R" and R''' are each members selected from the group consisting of normal, branch-chained and cyclic alkyl groups containing from about one to about 10 carbon atoms and phenyl, and at least three moles of water per mole of olefin, at a temperature above 160°C.

2. A process according to claim 1 wherein the halogen is a member selected from the group consisting of chlorine and bromine.

3. A process according to claim 1 wherein the olefin is an unsaturated glyceride.

4. A process according to claim 1 wherein the olefin is a member selected from the group consisting of 1-octene, 1-decene, 1-dodecene, 1-tetradecene, 1-hexadecene, 1-octadecene, oleic acid, methyl oleate, ricinoleic acid, and methyl ricinoleate.

5. A process according to claim 1 wherein the amide is a member selected from the group consisting of dimethylformamide, dimethylacetamide, dimethylpropionamide, dimethylbutyramide, diethylpentanamide, dimethyloctanamide, dimethylnonanamide, dimethyladecanamide, and dimethylbenzamide.

6. A process according to claim 1 where the halogen is chlorine, the olefin is a member selected from the group consisting of 1-octene, 1-decene, 1-dodecene, 1-tetradecene, 1-hexadecene, 1-octadecene, oleic acid, methyl oleate, ricinoleic acid, ricinolenic acid, lard, tallow, soybean oil, and methyl ricinoleate and wherein the amide is a member selected from the group consisting of dimethylformamide, dimethylacetamide, dimethylpropionamide, dimethylbutyramide, dimethylpentanamide, dimethyloctanamide, dimethylnonanamide, dimethyldecanamide and dimethylbenzamide.

7. A process according to claim 1 comprising reacting an olefin of the formula

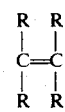

wherein each R is a member selected from the group consisting of hydrogen, alkyl, aryl, carboxyalkyl, alkoxy, alkylglycerylester, alkylester, nitroalkyl, haloalkyl and polyalkoxyalkyl, with a halogen selected from the group consisting of chlorine and bromine in the presence of an amide of the formula

R'C(O)NR"R''' wherein R' is a member selected from the group consisting of hydrogen, normal, branch-chained and cyclic alkyl groups containing from about one to about 10 carbon atoms and phenyl, and R" and R''' are each members selected from the group consisting of normal, branched-chain and cyclic alkyl groups containing from one to about 10 carbon atoms and phenyl, in the presence of at least 3 moles of water per mole of olefin, at a temperature from 170° to 250°C.

* * * * *